United States Patent
Kojima et al.

(10) Patent No.: US 7,959,167 B2
(45) Date of Patent: Jun. 14, 2011

(54) STEERING APPARATUS

(75) Inventors: Kazuhiko Kojima, Maebashi (JP); Shinya Amada, Maebashi (JP)

(73) Assignee: NSK Ltd., Tokyo (JP)

( * ) Notice: Subject to any disclaimer, the term of this patent is extended or adjusted under 35 U.S.C. 154(b) by 312 days.

(21) Appl. No.: 12/094,030

(22) PCT Filed: Nov. 17, 2006

(86) PCT No.: PCT/JP2006/322986
§ 371 (c)(1),
(2), (4) Date: May 16, 2008

(87) PCT Pub. No.: WO2007/060887
PCT Pub. Date: May 31, 2007

(65) Prior Publication Data
US 2009/0250894 A1 Oct. 8, 2009

(30) Foreign Application Priority Data

Nov. 22, 2005 (JP) ................................. 2005-336482

(51) Int. Cl.
*B62D 3/12* (2006.01)
*B62D 5/22* (2006.01)

(52) U.S. Cl. ............. 280/93.515; 280/93.514; 74/606 R

(58) Field of Classification Search ............. 280/93.513, 280/93.514, 93.515; 74/606 R
See application file for complete search history.

(56) References Cited

U.S. PATENT DOCUMENTS

| 5,778,731 A * | 7/1998 | Heep ................................ 74/498 |
| 6,435,050 B1 * | 8/2002 | Tanke et al. ..................... 74/422 |
| 6,595,532 B2 * | 7/2003 | Tanaka ..................... 280/93.515 |
| 2005/0104314 A1 * | 5/2005 | Maruyama et al. ...... 280/93.515 |

FOREIGN PATENT DOCUMENTS

| JP | 2000-006823 A | 1/2000 |
| JP | 2001-080528 A | 3/2001 |
| JP | 2005-96591 A | 4/2005 |

* cited by examiner

*Primary Examiner* — Toan C To
*Assistant Examiner* — George D. Spisich
(74) *Attorney, Agent, or Firm* — Sughrue Mion, PLLC

(57) ABSTRACT

Even when bending stress acts on a steering gearbox 1 about attachment holes 161 and 171 of vehicle attachment boss portions 16 and 17, deformation of the vehicle attachment boss portions 16 and 17 in both the longitudinal direction and the vertical direction of the vehicle becomes small since rigidity with respect to deformation in the vicinity of the vehicle attachment boss portions 16 and 17 in both the longitudinal direction and the vertical direction of the vehicle is large due to a first rib 61 to a fourth rib 64. Accordingly, it is possible to improve steering stability at the time a steering reaction force occurs.

4 Claims, 4 Drawing Sheets

STEERING APPARATUS

TECHNICAL FIELD

The present invention relates to a steering apparatus, and more particularly, to a steering apparatus including a steering gearbox which has a hollow cylindrical portion for allowing a rack shaft to be slidably fitted to the inside thereof and which is attachable to a vehicle frame.

BACKGROUND ART

A steering gearbox receives a steering reaction force transmitted from a traveling wheel during a steering operation. For this reason, in order to absorb the steering reaction force, an elastic member such as a cylindrical rubber bush is interposed between a bolt and an attachment hole for attaching the steering gearbox to the vehicle frame.

However, in such a technique in which the steering gearbox is attached to the vehicle frame by interposing the elastic member therebetween, the steering gearbox moves by an elastic deformation amount of the elastic member before the rack shaft moves at the time a pinion engaging with a rack shaft starts to rotate, thereby causing a delay of the steering operation. In order to obtain a highly-precise steering performance by solving the delay of the steering operation, in recent years, there has been increased a steering gearbox having a rigid structure in which an iron sleeve is interposed therebetween instead of the elastic bush (Patent Document 1) or a steering gearbox having a rigid structure in which the bush formed of the elastic member is removed.

FIGS. 2 to 4 illustrate a main part of the steering gearbox of the known steering apparatus having a vehicle attachment structure formed in the rigid structure: FIG. 2 is a front view; FIG. 3 is a front view illustrating a state at the time of receiving the steering reaction force transmitted from a traveling wheel during a steering operation; and FIG. 4 is a view illustrating a state at the time of receiving the steering reaction force transmitted from the traveling wheel during the steering operation when viewed from allow IV shown in FIG. 2.

As shown in FIG. 2, a steering gearbox 10 is attached to a vehicle frame 2 such as a front sub-frame. In FIG. 2, the upward direction is referred to as an vehicular upward direction, and the downward direction is referred to as a vehicular downward direction. In FIG. 2, the transverse direction is referred to as a vehicular transverse direction. In FIG. 2, a direction perpendicular to a paper surface is referred to as a vehicular longitudinal direction.

A rack shaft 3 is slidably fitted to an inner circumference 12 of a hollow cylindrical portion 11 of the steering gearbox 10 in the transverse direction shown in FIG. 2. Tie rods 41 and 42 are connected to both ends of the rack shaft 3, and the tie rods 41 and 42 are connected to a traveling wheel through a knuckle arm (not shown).

A pinion insertion cylindrical boss 13 is integrally formed with the left end of the hollow cylindrical portion 11 so as to protrude upward from an outer circumference 15 of the hollow cylindrical portion 11. A pinion (not shown) engaging with the rack shaft 3 is formed in the lower end of a pinion shaft 5 inserted into the pinion insertion cylindrical boss 13. The upper end of the pinion shaft 5 is connected to the lower end of the steering shaft (not shown) connected to the steering wheel.

A rack guide insertion cylindrical boss 14 is integrally formed with the left end of the hollow cylindrical portion 11 so as to be adjacent to the pinion insertion cylindrical boss 13 and to protrude from the outer circumference 15 of the hollow cylindrical portion 11 in the longitudinal direction of the vehicle (a front-side direction which is perpendicular to a paper surface). A rack guide (not shown) is inserted into the rack guide insertion cylindrical boss 14 so as to guide the back surface (a side opposite to a rack tooth surface) of the rack shaft 3 using a roller etc. and to prevent the deformation of the rack shaft 3 caused by a reaction force upon engaging with the pinion, thereby allowing the rack shaft 3 to smoothly slide thereon.

When a user rotates a steering wheel (not shown), the pinion of the pinion shaft 5 rotates, and then the rack shaft 3 slidably moves left and right in accordance with the rotation of the pinion, thereby changing a steering angle of a traveling wheel.

Vehicle attachment boss portions 16 and 17 are formed in the left end (an pinion-side end) of the hollow cylindrical portion 11 and the right end (an counter-pinion-side end) of the hollow cylindrical portion 11, respectively, so as to protrude from the outer circumference 15 of the hollow cylindrical portion 11 in the longitudinal direction of the vehicle (the front-side direction perpendicular to a paper surface). Circular attachment holes 161 and 171 are formed in the vehicle attachment boss portions 16 and 17, respectively, in the vertical direction of the vehicle (the vertical direction shown in FIG. 2).

The steering gearbox 10 is attached to the vehicle frame 2 in a rigid structure (a rigid body structure) without interposing the bush formed of the elastic member by inserting bolts 163 and 173 into the attachment holes 161 and 171 and then by firmly fastening the bolts 163 and 173 to the vehicle frame 2.

When the steering apparatus having such a steering gearbox 10 of a rigid structure is steered, and then a steering reaction force F transmitted from a traveling wheel acts on the steering gearbox 10, the steering reaction force directly acts on the vehicle attachment boss portions 16 and 17.

As a result, as shown in FIG. 3, the steering gearbox 10 deforms about the attachment holes 161 and 171 of the vehicle attachment boss portions 16 and 17 to thereby deform in the vertical direction of the vehicle. Additionally, as shown in FIG. 4, the steering gearbox 10 deforms about the attachment holes 161 and 171 of the vehicle attachment boss portions 16 and 17 to thereby deform in the longitudinal direction of the vehicle.

In particular, differently from the vicinity of the vehicle attachment boss portion 16 in the left end (the pinion-side end) of the hollow cylindrical portion 11, the vicinity of the vehicle attachment boss portion 17 in the right end (the counter-pinion-side end) of the hollow cylindrical portion 11 is not provided with the pinion insertion cylindrical boss 13 or the rack guide insertion cylindrical boss 14. Accordingly, the rigidity in the vicinity of the vehicle attachment boss portion 17 in the counter-pinion-side end is small, and the deformation in the vicinity of the vehicle attachment boss portion 17 becomes large at the time the steering reaction force F occurs. As a result, a problem arises in that the steering stability deteriorates.

In this way, in order to suppress the deformation in the vicinity of the vehicle attachment boss portion 17 in the counter-pinion-side end, as shown in FIG. 2, the vehicle attachment boss portion 17 in the counter-pinion-side end is connected to the outer circumference 15 of the hollow cylindrical portion 11, and ribs 18a and 18b are formed in parallel to the central axial line of the hollow cylindrical portion 11. Additionally, in order to suppress the deformation in the vicinity of the vehicle attachment boss portion 16 in the pinion-side end, the vehicle attachment boss portion 16 in the pinion-side end is connected to the outer circumference 15 of the hollow cylindrical portion 11, and ribs 19a and 19b are formed in parallel to the central axial line of the hollow cylindrical portion 11. However, such parallel ribs 18a, 18b, 19a, and 19b do not have sufficient rigidity for suppressing the deformation of the vehicle attachment boss portions 16 and 17.

Patent Document 1: Japanese Patent Unexamined Publication No. JP-A-2001-80528

DISCLOSURE OF THE INVENTION

Problem that the Invention is to Solve

An object of the invention is to provide a steering apparatus which suppresses the deformation in the vicinity of a vehicle attachment boss portion of a steering gearbox to thereby improve steering stability with a simple rib structure.

Means for Solving the Problem

The above-described problem can be solved by the following means. That is, according to a first aspect of the invention, there is provided a steering apparatus including:

a steering gearbox which is attachable to a vehicle frame and which includes a hollow cylindrical portion in which a rack shaft is slidably fitted to an inside thereof, the rack shaft being reciprocated by a rotation of a pinion attached to a lower end of a steering shaft;

vehicle attachment boss portions which are formed in both a pinion-side end and a counter-pinion-side end of the hollow cylindrical portion of the steering gearbox, respectively, so as to protrude from an outer circumference of the hollow cylindrical portion in a longitudinal direction of the vehicle, and in which attachment holes are formed in a vertical direction of the vehicle so as to attach the steering gearbox to the vehicle frame; and a first rib which is formed in a connection portion between the hollow cylindrical portion and the vehicle attachment boss portion of the counter-pinion-side end so as to connect the outer circumference of the hollow cylindrical portion to the vehicle attachment boss portion of the counter-pinion-side end, wherein the first rib includes two ribs, and the two ribs are formed in a V shape so as to intersect each other at a position connected to the hollow cylindrical portion and to be away from each other at a position connected to the vehicle attachment boss portion of the counter-pinion-side end.

According to a second aspect of the invention, in the steering apparatus described in the first aspect, a second rib is formed in the vicinity of the vehicle attachment boss portion of the counter-pinion-side end at an upper outer circumference of the hollow cylindrical portion in the counter-pinion-side end.

According to a third aspect of the invention, in the steering apparatus described in the first aspect, a third rib is formed in the vicinity of the vehicle attachment boss portion of the counter-pinion-side end at a lower outer circumference of the hollow cylindrical portion in the counter-pinion-side end.

According to a fourth aspect of the invention, in the steering apparatus described in the first aspect, a second rib is formed in the vicinity of the vehicle attachment boss portion of the counter-pinion-side end at an upper outer circumference of the hollow cylindrical portion in the counter-pinion-side end; and a third rib is formed in the vicinity of the vehicle attachment boss portion of the counter-pinion-side end at a lower outer circumference of the hollow cylindrical portion in the counter-pinion-side end.

According to a fifth aspect of the invention, in the steering apparatus described in the first aspect, a fourth rib is formed in a connection portion between the hollow cylindrical portion and the vehicle attachment boss portion of the pinion-side end so as to connect the outer circumference of the hollow cylindrical portion to the vehicle attachment boss portion of the pinion-side end, the fourth rib includes two ribs, and the two ribs are substantially formed in a V shape so as to intersect each other at a position connected to the hollow cylindrical portion and to be away from each other at a position connected to the vehicle attachment boss portion of the pinion-side end.

According to a sixth aspect of the invention, in the steering apparatus described in the second aspect, a fourth rib is formed in a connection portion between the hollow cylindrical portion and the vehicle attachment boss portion of the pinion-side end so as to connect the outer circumference of the hollow cylindrical portion to the vehicle attachment boss portion of the pinion-side end, the fourth rib includes two ribs, and the two ribs are substantially formed in a V shape so as to intersect each other at a position connected to the hollow cylindrical portion and to be away from each other at a position connected to the vehicle attachment boss portion of the pinion-side end.

According to a seventh aspect of the invention, in the steering apparatus described in the third aspect, a fourth rib is formed in a connection portion between the hollow cylindrical portion and the vehicle attachment boss portion of the pinion-side end so as to connect the outer circumference of the hollow cylindrical portion to the vehicle attachment boss portion of the pinion-side end, the fourth rib includes two ribs, and the two ribs are substantially formed in a V shape so as to intersect each other at a position connected to the hollow cylindrical portion and to be away from each other at a position connected to the vehicle attachment boss portion of the pinion-side end.

According to an eighth aspect of the invention, in the steering apparatus described in the fourth aspect, a fourth rib which is formed in a connection portion between the hollow cylindrical portion and the vehicle attachment boss portion of the pinion-side end so as to connect the outer circumference of the hollow cylindrical portion to the vehicle attachment boss portion of the pinion-side end, the fourth rib includes two ribs, and the two ribs are substantially formed in a V shape so as to intersect each other at a position connected to the hollow cylindrical portion and to be away from each other at a position connected to the vehicle attachment boss portion of the pinion-side end.

Advantage of the Invention

In the steering apparatus according to the first aspect of the invention, two ribs configure the first rib for connecting the outer circumference of the hollow cylindrical portion to the vehicle attachment boss portion of the counter-pinion-side end. The two ribs are formed in a V shape so as to intersect each other at a position connected to the hollow cylindrical portion and to be away from each other at a position connected to the vehicle attachment boss portion of the counter-pinion-side end.

Accordingly, the first rib forms a closed loop by the vehicle attachment boss portion and the two ribs which are formed in a V shape. As a result, it is possible to effectively suppress the deformation of the vehicle attachment boss portion of the counter-pinion-side end in both the vertical direction and the longitudinal direction of the vehicle, and to thereby improve the steering stability.

In the steering apparatus according to the second aspect of the invention, the second rib is formed in the vicinity of the vehicle attachment boss portion of the counter-pinion-side end, in the upper outer circumference of the hollow cylindrical portion in the counter-pinion-side end.

Accordingly, the second rib assists the first rib to suppress the deformation of the vehicle attachment boss portion of the counter-pinion-side end in the vertical direction of the vehicle, and to thereby further improve the steering stability.

In the steering apparatus according to the third aspect of the invention, the third rib is formed in the vicinity of the vehicle attachment boss portion of the counter-pinion-side end, in the lower outer circumference of the hollow cylindrical portion in the counter-pinion-side end.

Accordingly, the third rib assists the first rib to suppress the deformation of the vehicle attachment boss portion of the counter-pinion-side end in the vertical direction of the vehicle, and to thereby further improve the steering stability.

In the steering apparatus according to the fourth aspect of the invention, the second rib is formed in the vicinity of the vehicle attachment boss portion of the counter-pinion-side end on the upper outer circumference of the hollow cylindrical portion in the counter-pinion-side end, and the third rib is formed in the vicinity of the vehicle attachment boss portion of the counter-pinion-side end on the lower outer circumference of the hollow cylindrical portion in the counter-pinion-side end.

Accordingly, the second rib and the third rib assist the first rib to suppress the deformation of the vehicle attachment boss portion of the counter-pinion-side end in the vertical direction of the vehicle, and to thereby further improve the steering stability.

In the steering apparatus according to the fifth aspect to the eighth aspect of the invention, two ribs configure the fourth rib for connecting the outer circumference of the hollow cylindrical portion to the vehicle attachment boss portion of the pinion-side end. The two ribs are substantially formed in a V shape so as to intersect each other at a position connected to the hollow cylindrical portion and to be away from each other at a position connected to the vehicle attachment boss portion of the pinion-side end.

Accordingly, since the fourth rib forms a closed loop by the vehicle attachment boss portion and the two ribs, it is possible to effectively suppress the deformation of the vehicle attachment boss portion of the pinion-side end in both the vertical direction and the longitudinal direction of the vehicle, and to thereby improve the steering stability.

DESCRIPTION OF REFERENCE NUMERALS AND SIGNS

1: STEERING GEARBOX
10: STEERING GEARBOX
11: HOLLOW CYLINDRICAL PORTION
12: INNER CIRCUMFERENCE
13: PINION INSERTION CYLINDRICAL BOSS
14: RACK GUIDE INSERTION CYLINDRICAL BOSS
15: OUTER CIRCUMFERENCE
16, 17: VEHICLE ATTACHMENT BOSS PORTION
161, 171: ATTACHMENT HOLE
163, 173: BOLT
18a, 18b: RIB
19a, 19b: RIB
2: VEHICLE FRAME
3: RACK SHAFT
41, 42: TIE ROD
5: PINION SHAFT
61: FIRST RIB
61a, 61b: RIB
62: SECOND RIB
63: THIRD RIB
64: FOURTH RIB
64a, 64b: RIB

BEST MODE FOR CARRYING OUT THE INVENTION

Figure 1:
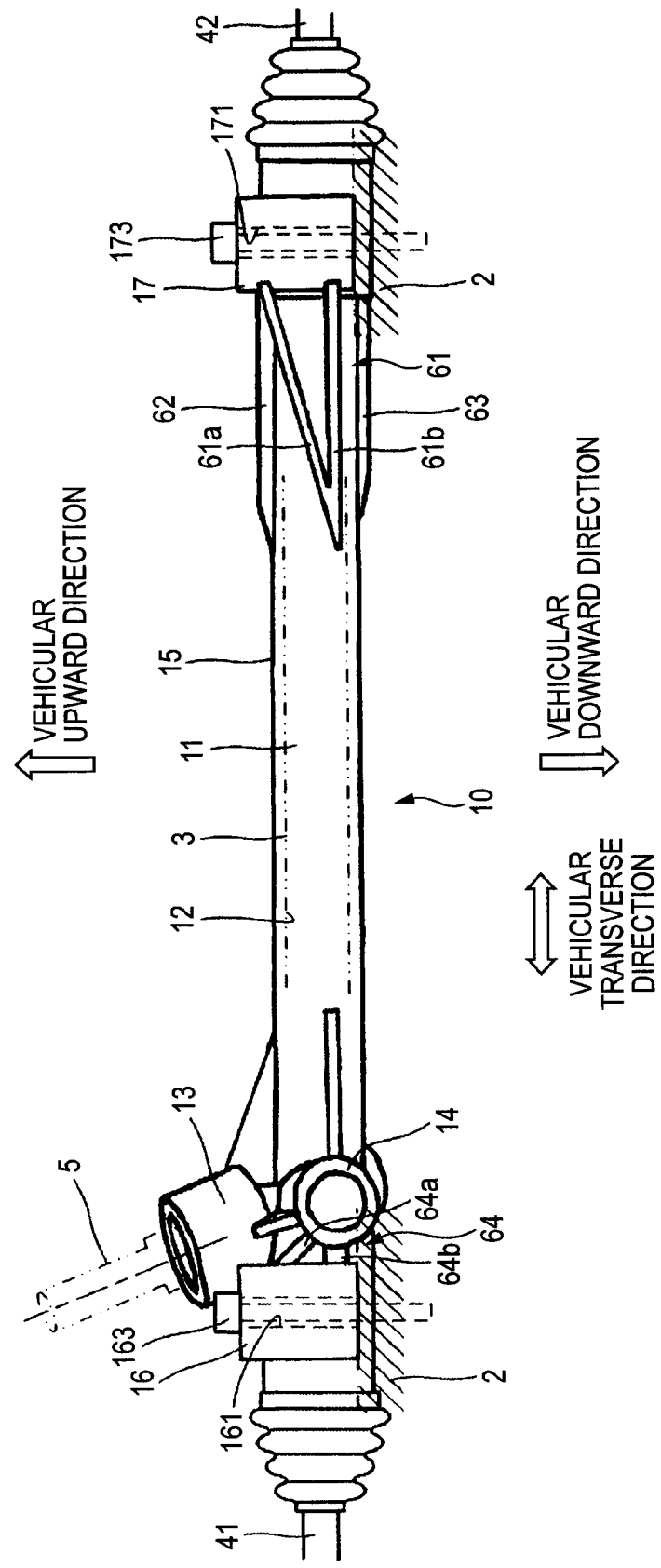
FIG. 1 is a front view illustrating a main part of a steering gearbox of a steering apparatus according to an embodiment of the invention.
Figure 2:
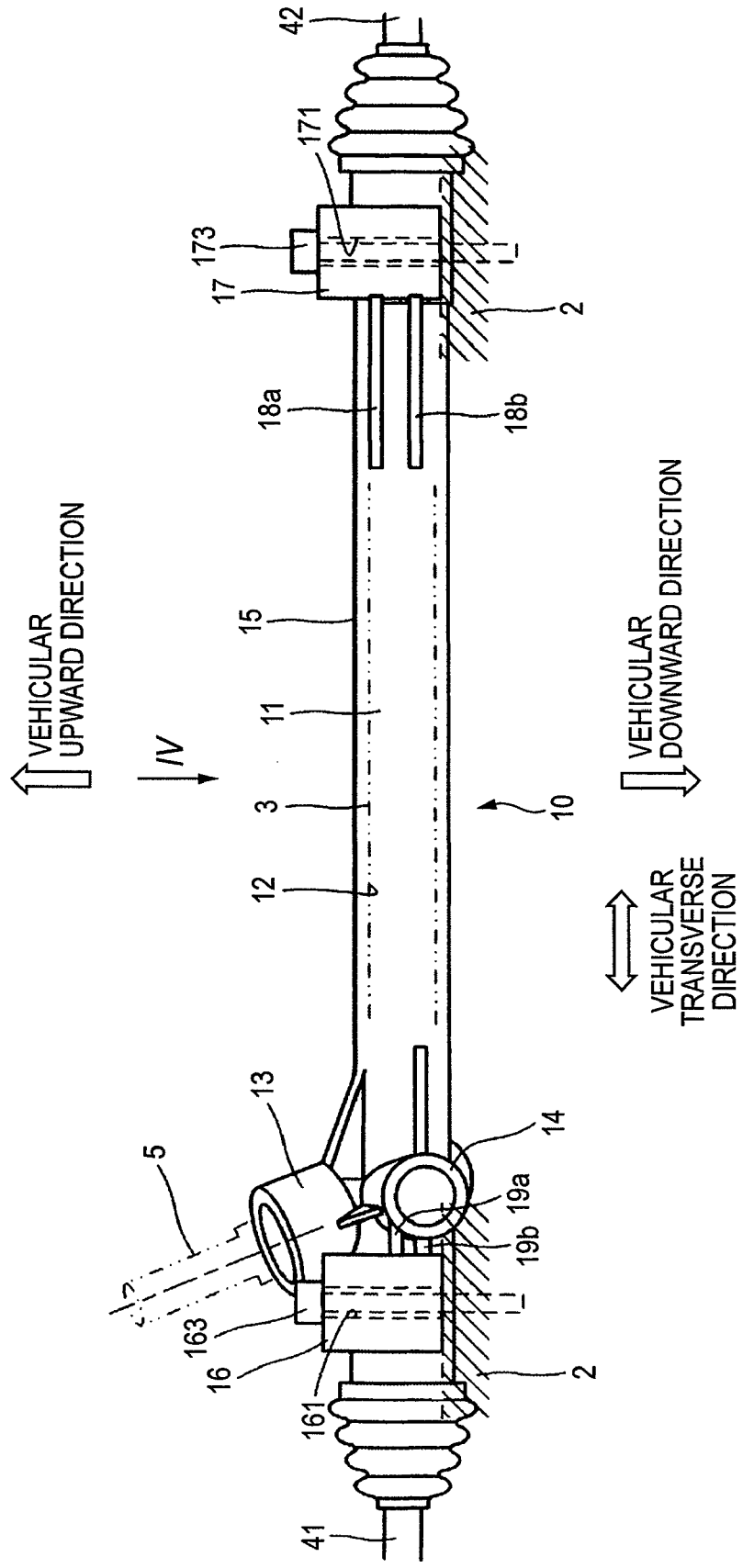
FIG. 2 is a front view illustrating a main part of a steering gearbox of a known steering apparatus.
Figure 3:
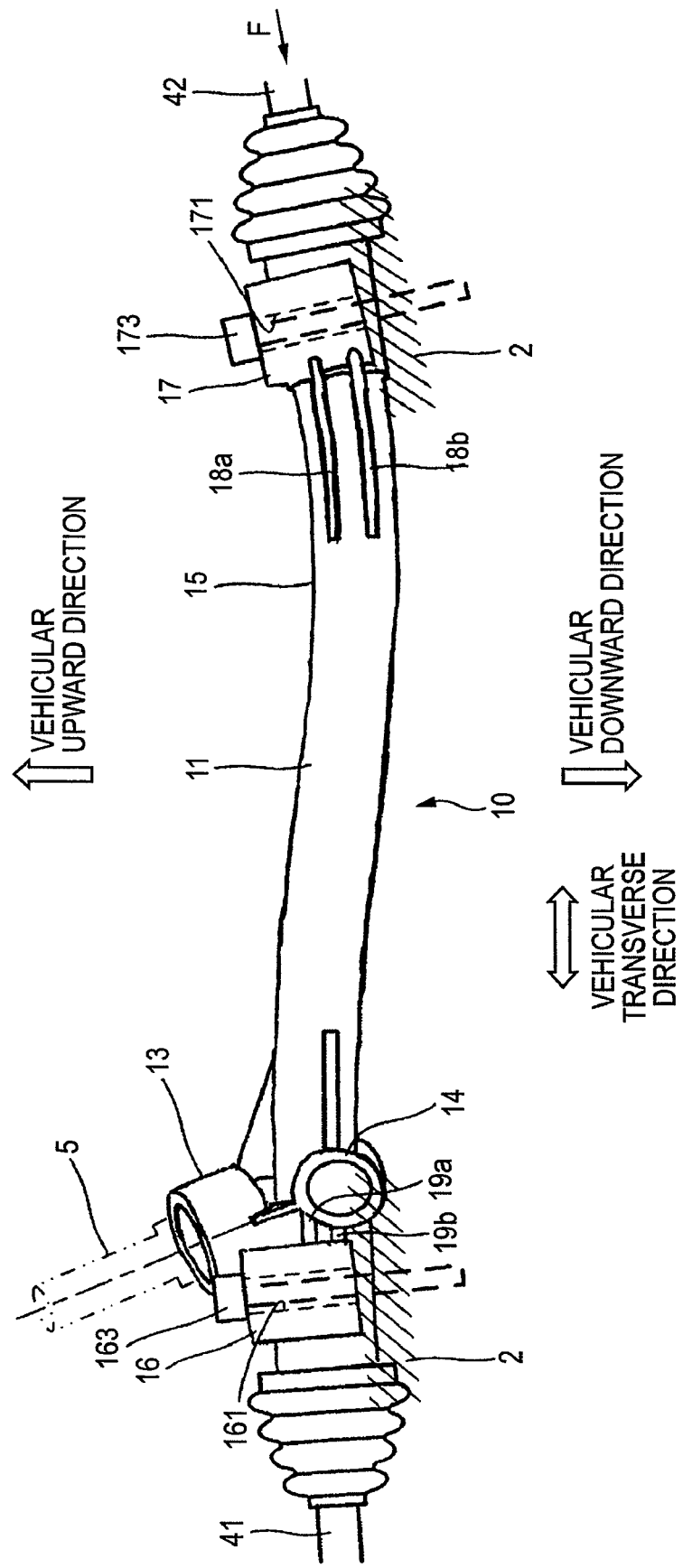
FIG. 3 is a front view illustrating a deformation state at the time the steering gearbox of the known steering apparatus receives a steering reaction force transmitted from a traveling wheel during a steering operation.
Figure 4:
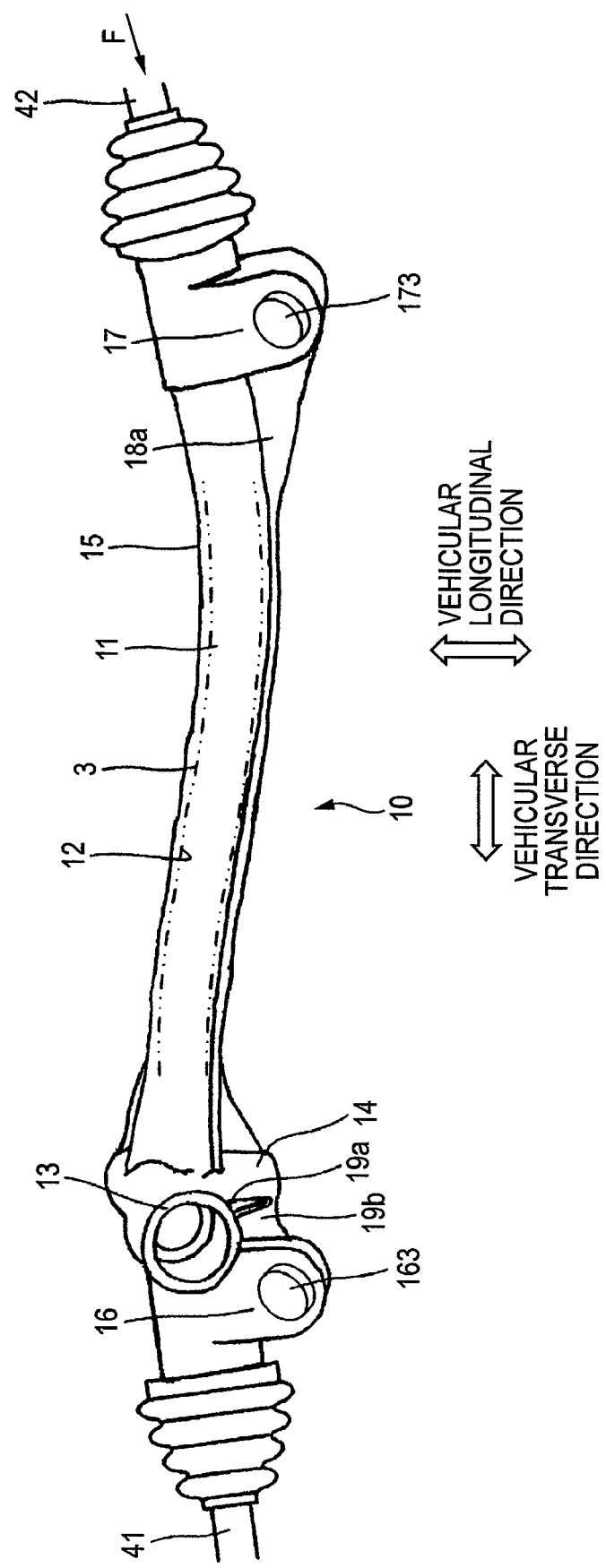
FIG. 4 is a view illustrating a deformation state at the time the steering gearbox of the known steering apparatus receives a steering reaction force transmitted from the traveling wheel during the steering operation when viewed IV shown in FIG. 2.

Hereinafter, an embodiment of the invention will be described with reference to the accompanying drawings. FIG. 1 is a front view illustrating a main part of a steering gearbox of a steering apparatus according to an embodiment of the invention. As shown in FIG. 1, a steering gearbox 1 according to the embodiment of the invention is attached to a vehicle frame 2 such as a front sub-frame. In FIG. 1, the upward direction is referred to as an vehicular upward direction, and the downward direction is referred to as a vehicular downward direction. In FIG. 1, the transverse direction is referred to as a vehicular transverse direction. In FIG. 1, a direction perpendicular to a paper surface is referred to as a vehicular longitudinal direction.

A rack shaft 3 is slidably fitted to an inner circumference 12 of a hollow cylindrical portion 11 of the steering gearbox 1 in the transverse direction shown in FIG. 1. Tie rods 41 and 42 are connected to both ends of the rack shaft 3, and the tie rods 41 and 42 are connected to a traveling wheel through a knuckle arm (not shown).

A pinion insertion cylindrical boss 13 is integrally formed with the left end of the hollow cylindrical portion 11 so as to protrude upward from an outer circumference 15 of the hollow cylindrical portion 11. A pinion (not shown) engaging with the rack shaft 3 is formed in the lower end of a pinion shaft 5 inserted into the pinion insertion cylindrical boss 13. The upper end of the pinion shaft 5 is connected to the lower end of the steering shaft (not shown) connected to the steering wheel.

A rack guide insertion cylindrical boss 14 is integrally formed with the left end of the hollow cylindrical portion 11 so as to be adjacent to the pinion insertion cylindrical boss 13 and to protrude from the outer circumference 15 of the hollow cylindrical portion 11 in the longitudinal direction of the vehicle (a front-side direction perpendicular to a paper surface). A rack guide (not shown) is inserted into the rack guide insertion cylindrical boss 14 so as to guide the back surface (a side opposite to rack tooth surface) of the rack shaft 3 using a roller etc. and to prevent the deformation of the rack shaft 3 caused by a reaction force upon engaging with the pinion, thereby allowing the rack shaft 3 to smoothly slide thereon.

When a driver rotates a steering wheel (not shown), the pinion of the pinion shaft 5 rotates, and then the rack shaft 3 slidably moves left and right in accordance with the rotation of the pinion, thereby changing steering angle of a traveling wheel.

Vehicle attachment boss portions 16 and 17 are formed in the left end (an pinion-side end) of the hollow cylindrical portion 11 and the right end (an counter-pinion-side end) of the hollow cylindrical portion 11, respectively, so as to protrude from the outer circumference 15 of the hollow cylindrical portion 11 in the longitudinal direction of the vehicle (the front-side direction perpendicular to a paper surface). Circular attachment holes 161 and 171 are formed in the vehicle attachment boss portions 16 and 17, respectively, in the vertical direction of the vehicle (the vertical direction shown in FIG. 1).

The steering gearbox 10 is attached to the vehicle frame 2 in a rigid structure (a rigid body structure) without interposing the bush formed of the elastic member by inserting bolts 163 and 173 into the attachment holes 161 and 171 and then by firmly fastening the bolts 163 and 173 to the vehicle frame 2.

In order to suppress the deformation in the vicinity of the vehicle attachment boss portion 17 in the counter-pinion-side end, a first rib 61, which connects the outer circumference 15 of the hollow cylindrical portion 11 to the vehicle attachment boss portion 17 in the counter-pinion-side end, is formed in a connection portion between the outer circumference 15 of the hollow cylindrical portion 11 and the vehicle attachment boss portion 17 in the counter-pinion-side end.

The first rib 61 includes two ribs, that is, an upper rib 61a and a lower rib 61b below the rib 61a as shown in FIG. 1. The ribs 61a and 61b are formed in a V shape so as to intersect each other at a position connected to the hollow cylindrical portion 11 (on the left side of the vehicle attachment boss portion 17 shown in FIG. 1) and to be away from each other at a position connected to the vehicle attachment boss portion 17 in the vertical direction of the vehicle.

The first rib 61 forms a triangle-like closed loop by the vehicle attachment boss portion 17, the rib 61a, and the rib 61b. As a result, it is possible to configure an effective rib structure of which the rigidity is strong against the deformation of the vehicle attachment boss portion 17 in both the vertical direction and the longitudinal direction of the vehicle.

A second rib 62 is formed in the vicinity of the vehicle attachment boss portion 17 in the counter-pinion-side end on the upper side of the vehicle of the outer circumference 15 of the hollow cylindrical portion 11 in the counter-pinion-side end. Additionally, a third rib 63 is formed in the vicinity of the vehicle attachment boss portion 17 in the counter-pinion-side end, in the lower outer circumference 15 of the hollow cylindrical portion 11 in the counter-pinion-side end.

The second rib 62 and the third rib 63 assists a deformation suppression effect of the first rib 61 in the vertical direction of the vehicle with respect to the deformation of the vehicle attachment boss portion 17 in the counter-pinion-side end in the vertical direction of the vehicle.

Additionally, in order to suppress the deformation in the vicinity of the vehicle attachment boss portion 16 in the pinion-side end, a fourth rib 64, which connects the vehicle attachment boss portion 16 in the pinion-side end to the outer circumference 15 of the hollow cylindrical portion 11, is formed in a position where the vehicle attachment boss portion 16 in the pinion-side end is connected to the outer circumference 15 of the hollow cylindrical portion 11.

The fourth rib 64 includes two ribs, that is, an upper rib 64a and a lower rib 64b below the upper rib 64a as shown in FIG. 1. The ribs 64a and 64b are formed in a V shape so as to be connected to the rack guide insertion cylindrical boss 14 while intersecting each other at a position connected to the hollow cylindrical portion 11 (on the right side of the vehicle attachment boss portion 16 shown in FIG. 1) and to be away from each other at a position connected to the vehicle attachment boss portion 16 in the vertical direction of the vehicle.

The fourth rib 64 forms a square-like closed loop by the vehicle attachment boss portion 16, the rib 64a, the rib 64b, and the rack guide insertion cylindrical boss 14. As a result, it is possible to configure an effective rib structure of which the rigidity is strong against the deformation of the vehicle attachment boss portion 16 in the vertical direction of the vehicle and the longitudinal direction of the vehicle.

With such a rib structure, when the steering apparatus having the steering gearbox 1 attached to the vehicle frame 2 in a rigid structure is steered, the steering reaction force transmitted from a traveling wheel acts on the steering gearbox 1, and then the steering reaction force directly acts on the vehicle attachment boss portions 16 and 17.

As a result, even when bending stress acts on the steering gearbox 1 about the attachment holes 161 and 171 of the vehicle attachment boss portions 16 and 17, the deformation of in the vicinity of the vehicle attachment boss portions 16 and 17 in both the longitudinal direction and the vertical direction of the vehicle becomes small since the rigidity with respect to the deformation in the vicinity of the vehicle attachment boss portions 16 and 17 in both the longitudinal direction and the vertical direction of the vehicle is large due to the first rib 61 to the fourth rib 64. Accordingly, it is possible to improve steering stability at the time the steering reaction force occurs.

While the above-described embodiment has described a case where the invention is applied to the steering apparatus not using a steering assist force, it is more effective when the invention is applied to the steering apparatus such as an electric power steering apparatus which has the steering assist force and in which a large steering reaction force occurs.

While the invention has been described in detail with reference to the exemplary embodiment, it will be obvious that the invention may be modified into various forms by those skilled in the art without departing from the spirit and scope of the invention.

This application claims the benefit of priority to Japanese Patent Application No. 2005-336482, filed Nov. 22, 2005, which is hereby incorporated by reference.

INDUSTRIAL APPLICABILITY

In the steering apparatus according to the invention, the first rib, which connects the outer circumference of the hollow cylindrical portion to the vehicle attachment boss portion of the counter-pinion-side end, includes two ribs. The two ribs are formed in a V shape so as to intersect each other at a position connected to the hollow cylindrical portion and to be away from each other at a position connected to the vehicle attachment boss portion of the counter-pinion-side end in the vertical direction of the vehicle.

Accordingly, the first rib forms a closed loop by the vehicle attachment boss portion and the two ribs formed in a V shape. As a result, it is possible to effectively suppress the deformation of the vehicle attachment boss portion of the counter-pinion-side end in both the vertical direction and the longitudinal direction of the vehicle, and to thereby improve the steering stability.

The invention claimed is:

1. A steering apparatus comprising:
    a steering gearbox which is attachable to a vehicle frame and which includes a hollow cylindrical portion in which a rack shaft is slidably fitted to an inside thereof, the rack shaft being reciprocated by a rotation of a pinion attached to a lower end of a steering shaft;
    vehicle attachment boss portions which are formed in both a pinion-side end and a counter-pinion-side end of the hollow cylindrical portion of the steering gearbox, respectively, so as to protrude from an outer circumference of the hollow cylindrical portion in a longitudinal direction of the vehicle, and in which attachment holes are formed in a vertical direction of the vehicle so as to attach the steering gearbox to the vehicle frame; and
    a first rib which is formed in a connection portion between the hollow cylindrical portion and the vehicle attachment boss portion of the counter-pinion-side end so as to connect the outer circumference of the hollow cylindrical portion to the vehicle attachment boss portion of the counter-pinion-side end,
    wherein the first rib includes two ribs, and
    wherein the two ribs are formed in a V shape such that respective first ends thereof intersect each other at a position connected to the hollow cylindrical portion and respective second ends thereof are displaced from each other in the vertical direction at a position connected to the vehicle attachment boss portion of the counter-pinion-side end.

2. The steering apparatus according to claim 1, further comprising:
    a second rib which is formed in the vicinity of the vehicle attachment boss portion of the counter-pinion-side end at an upper outer circumference of the hollow cylindrical portion in the counter-pinion-side end.

3. The steering apparatus according to claim 2, further comprising:
    a third rib which is formed in the vicinity of the vehicle attachment boss portion of the counter-pinion-side end at a lower outer circumference of the hollow cylindrical portion in the counter-pinion-side end.

4. The steering apparatus according to claim 3, further comprising:
    a fourth rib which is formed in a connection portion between the hollow cylindrical portion and the vehicle attachment boss portion of the pinion-side end so as to connect the outer circumference of the hollow cylindrical portion to the vehicle attachment boss portion of the pinion-side end,
    wherein the fourth rib includes two ribs, and
    the two ribs are formed so that extended lines of the two ribs intersect each other at a side at which the two ribs are connected to the hollow cylindrical portion and to be displaced from each other at a position connected to the vehicle attachment boss portion of the pinion-side end.

* * * * *